US012327698B2

(12) United States Patent
Liu et al.

(10) Patent No.: US 12,327,698 B2
(45) Date of Patent: Jun. 10, 2025

(54) KEYBOARD DEVICE

(71) Applicant: Primax Electronics Ltd., Taipei (TW)

(72) Inventors: Chou-Liang Liu, Taipei (TW); Chen-Wei Chan, Taipei (TW); Tsung-Wen Hsueh, Taipei (TW)

(73) Assignee: Primax Electronics Ltd., Taipei (TW)

( * ) Notice: Subject to any disclaimer, the term of this patent is extended or adjusted under 35 U.S.C. 154(b) by 210 days.

(21) Appl. No.: 18/210,485

(22) Filed: Jun. 15, 2023

(65) Prior Publication Data

US 2024/0371582 A1 Nov. 7, 2024

(30) Foreign Application Priority Data

May 3, 2023 (TW) ................................ 112116516

(51) Int. Cl.
*H01H 13/704* (2006.01)
*H01H 13/705* (2006.01)

(52) U.S. Cl.
CPC ........ *H01H 13/704* (2013.01); *H01H 13/705* (2013.01)

(58) Field of Classification Search
CPC ...... H01H 13/704; H01H 13/705; H01H 3/12; H01H 3/125; H01H 13/14; H01H 13/70; H01H 13/702; H01H 13/703; H01H 2209/068; H01H 2209/074
See application file for complete search history.

(56) References Cited

U.S. PATENT DOCUMENTS 10,937,609 B1 * 3/2021 Chen .................... H01H 13/785
11,728,108 B2 * 8/2023 Pan ...................... H01H 13/704 200/344
2024/0429004 A1 * 12/2024 Kang .................. H01H 13/704

* cited by examiner

*Primary Examiner* — Lheiren Mae A Caroc
(74) *Attorney, Agent, or Firm* — KIRTON McCONKIE; Evan R. Witt

(57) ABSTRACT

A keyboard device includes a membrane circuit board and a support plate. The membrane circuit board has a plurality of key regions and a peripheral region surrounding the key regions. The membrane circuit board includes: a lower membrane layer; an upper membrane layer disposed over the lower membrane layer; and a sensing circuit pattern disposed over the upper membrane layer and in the peripheral region, in which the sensing circuit pattern includes a surrounding wire and at least one connecting wire, and the surrounding wire surrounds the key regions, and the at least one connecting wire is connected between two adjacent portions of the surrounding wire. The support plate is disposed beneath the membrane circuit board.

10 Claims, 3 Drawing Sheets

KEYBOARD DEVICE

FIELD OF THE INVENTION

The present disclosure relates to a keyboard device, in particular to a keyboard device with a proximity sensing function.

BACKGROUND OF THE INVENTION

Generally, a sheet metal layer is used in a keyboard device with a proximity sensing function and acted as a sensing layer, but its cost is high, and it causes an overall thickness of the keyboard device to increase, which is not conducive to lighter and thinner requirements of the keyboard device.

SUMMARY OF THE INVENTION

The present disclosure provides a keyboard device, which includes a membrane circuit board and a support plate. The membrane circuit board has a plurality of key regions and a peripheral region surrounding the key regions. The membrane circuit board includes: a lower membrane layer; an upper membrane layer disposed over the lower membrane layer; and a sensing circuit pattern disposed over the upper membrane layer and in the peripheral region, in which the sensing circuit pattern includes a surrounding wire and at least one connecting wire, and the surrounding wire surrounds the key regions, and the at least one connecting wire is connected between two adjacent portions of the surrounding wire. The support plate is disposed beneath the membrane circuit board.

In some embodiments of the present disclosure, a length of the at least one connecting wire is smaller than a width of one of the key regions.

In some embodiments of the present disclosure, the two adjacent portions of the surrounding wire are two adjacent portions of the surrounding wire surrounding two adjacent of the key regions.

In some embodiments of the present disclosure, the at least one connecting wire is straight.

In some embodiments of the present disclosure, the surrounding wire includes a circular wire surrounding one of the key regions, a continuous wire surrounding at least two of the key regions, or a combination thereof.

In some embodiments of the present disclosure, the surrounding circuit includes the circular wire and the continuous wire, and the at least one connecting wire is connected between a portion of the circular wire and a portion of the continuous wire, and the portion of the circular wire and the portion of the continuous wire are adjacent to each other.

In some embodiments of the present disclosure, the surrounding wire includes the continuous wire, and the at least one connecting wire is connected between two adjacent portions of the continuous wire.

In some embodiments of the present disclosure, the at least one connecting wire is a plurality of connecting wires, and two of the connecting wires are crossed with each other.

In some embodiments of the present disclosure, the sensing circuit pattern is not disposed in the key regions.

In some embodiments of the present disclosure, the keyboard device further includes: a circuit board disposed beneath the support plate; and a receiving wire disposed between the support plate and the membrane circuit board, in which the support plate has a plurality of through openings, and the receiving wire is adjacent to the through openings.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
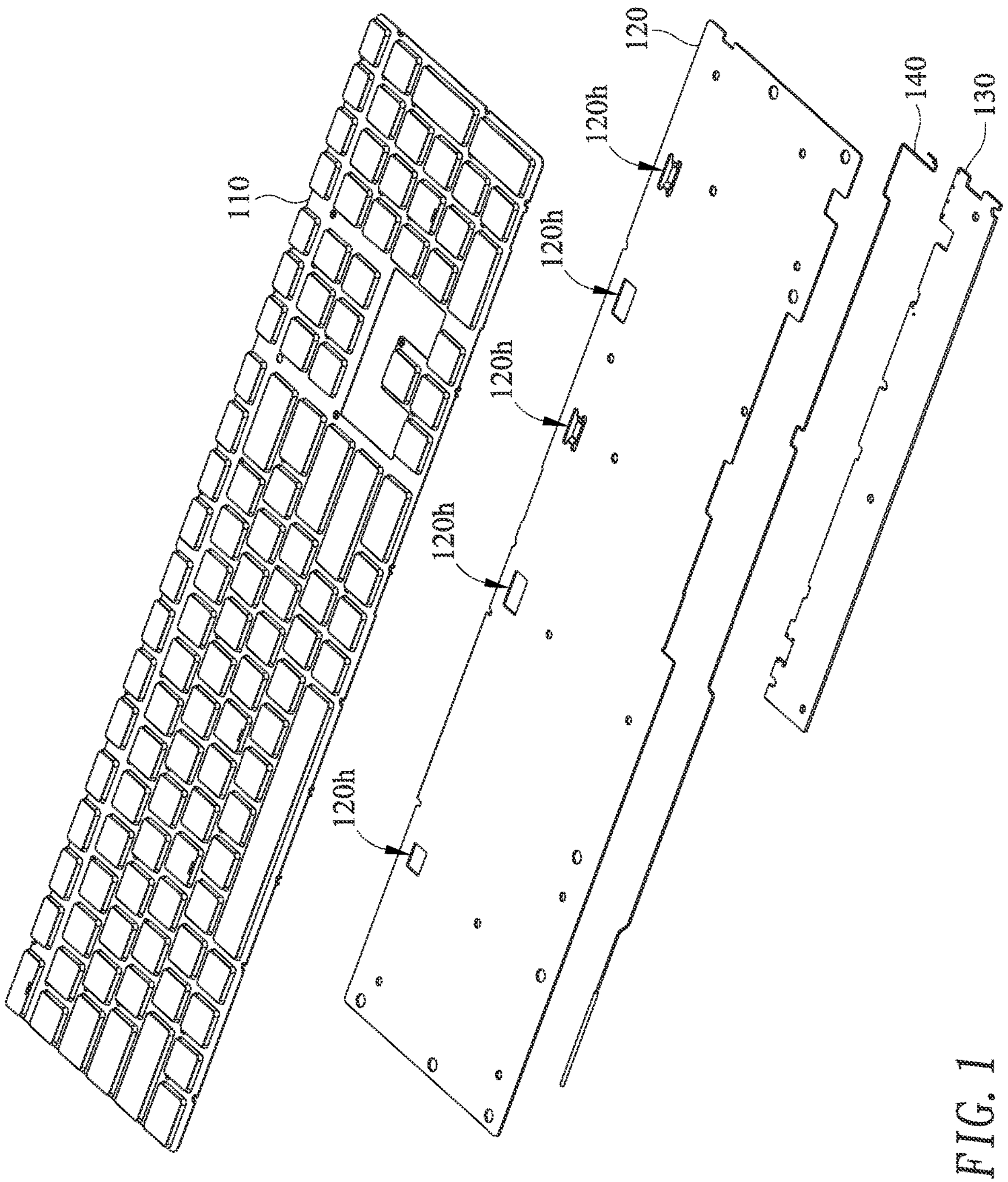
FIG. 1 is a perspective view of a keyboard device according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as “beneath” and “over”, are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from “beneath” to “over.” The spatially relative descriptions used herein should be interpreted the same.

As mentioned in background of the invention, generally, the sheet metal layer is used in the keyboard device with the proximity sensing function and acted as the sensing layer, but its cost is high, and it causes the overall thickness of the keyboard device to increase, which is not conducive to lighter and thinner requirements of the keyboard device. Therefore, the present invention provides a keyboard device, which is provided with a sensing circuit pattern disposed over an upper membrane layer of a membrane circuit board, which not only enables the keyboard device to have the proximity sensing function, but is also low cost and conducive to lighter and thinner requirements of the keyboard device. Various embodiments of the keyboard device of the present invention will be described in detail below.

FIG. 1 is a perspective view of a keyboard device according to an embodiment of the present invention. Please refer to FIG. 1, the keyboard device includes a membrane circuit board 110 and a support plate 120, and the support plate 120 is disposed beneath the membrane circuit board 110 and configured to support components above it, for example, to support the membrane circuit board 110, a base plate (not shown) and a backlight module (not shown). In some embodiments, the backlight module is disposed beneath the membrane circuit board 110, and the base plate is disposed between the membrane circuit board 110 and the backlight module.

Figure 2:
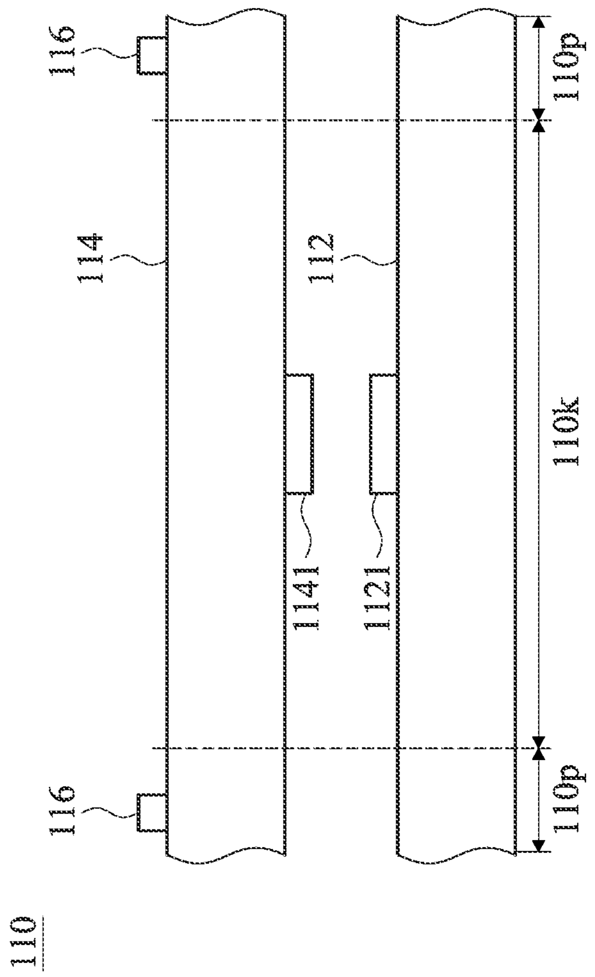
FIG. 2 is a schematic cross-sectional view of a key region and a peripheral region of a membrane circuit board according to an embodiment of the present invention.

FIG. 2 is a schematic cross-sectional view of a key region and a peripheral region of a membrane circuit board according to an embodiment of the present invention. Please refer to FIGS. 1 and 2, the membrane circuit board 110 has a plurality of key regions 110*k* and a peripheral region 110*p* surrounding the key regions 110*k*.

Referring to FIG. 2, the membrane circuit board 110 includes a lower membrane layer 112, an upper membrane layer 114 and a sensing circuit pattern 116. The upper membrane layer 114 is disposed over the lower membrane layer 112. In some embodiments, the lower membrane layer 112 has a first contact 1121, and the upper membrane layer 114 has a second contact 1141, and the first contact 1121 and the corresponding second contact 1141 together form a membrane switch. In some embodiments, when the keycap is pressed and moves downward, abutment of an elastic element (not shown) triggers the membrane switch, so that the keyboard device generates a corresponding key signal. In some embodiments, the membrane circuit board 110 further includes a middle membrane layer (not shown) disposed between the lower membrane layer 112 and the upper membrane layer 114. The sensing circuit pattern 116 is disposed over the upper membrane layer 114. In some embodiments, the sensing circuit pattern 116 is formed by printing with silver paste, but the invention is not limited thereto.

Please refer to FIG. 2, the sensing circuit pattern 116 is disposed in the peripheral region 110*p*. In some embodiments, the sensing circuit pattern 116 is not disposed in the key region 110*k*. In some embodiments, referring to FIGS. 1 and 2, the sensing circuit pattern 116 is distributed in the entire peripheral region 110*p* of the upper membrane layer 114 of the membrane circuit board 110, so when a user's hand is close to any edge or any key of the keyboard device, capacitance of the sensing circuit pattern 116 changes, and a receiving wire receives a capacitance change signal, so that the keyboard device can activate corresponding function(s) (e.g., turning on the backlight, waking up the keyboard and/or waking up the computer). In some embodiments, as shown in FIG. 1, the keyboard device further includes a circuit board 130 and a receiving wire 140. The membrane circuit board 130 is disposed beneath the support plate 120, and the receiving wire 140 is disposed between the support plate 120 and the membrane circuit board 130. The support plate 120 has a plurality of through openings 120*h*, and the receiving wire 140 is adjacent to the through openings 120*h* to receive the signal of the sensing circuit pattern 116.

Figure 3:
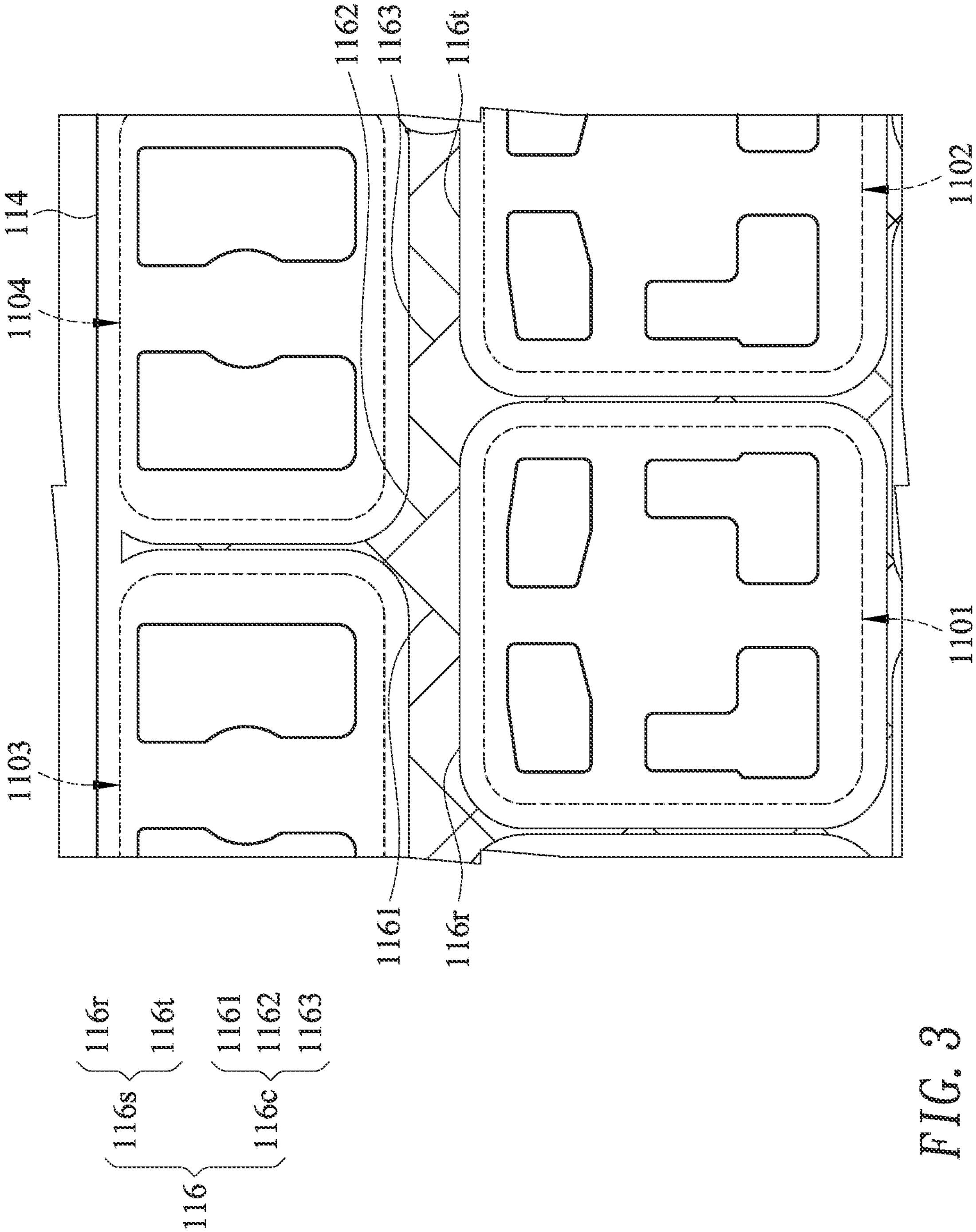
FIG. 3 is a schematic top view of a sensing circuit pattern according to an embodiment of the present invention.

FIG. 3 is a schematic top view of a sensing circuit pattern according to an embodiment of the present invention. Referring to FIG. 3, the membrane circuit board has a plurality of key regions 1101, 1102, 1103 and 1104 and a peripheral region (not marked) surrounding the key regions 1101, 1102, 1103 and 1104. Each of the key regions 1101, 1102, 1103 and 1104 may be provided with a plurality of hollow regions (not marked) for other components (e.g., hooks of the base plate) to pass through.

Please refer to FIG. 3, the sensing circuit pattern 116 is disposed in the peripheral region. The sensing circuit pattern 116 includes a surrounding wire 116*s* and at least one connecting wire 116*c*. The surrounding wire 116*s* surrounds the key regions 1101, 1102, 1103 and 1104. In some embodiments, the surrounding wire 116*s* surrounds all of the key regions of the membrane circuit board 110. In some embodiments, the surrounding wire 116*s* surrounds at least three edges of a single key region, or nearly or completely surrounds a single key region.

The at least one connecting wire 116*c* is connected between two adjacent portions of the surrounding wire 116*s*. A distance between the two adjacent portions of the surrounding wire 116*s* is very short, for example, the distance is smaller than a width of a single key region. In some embodiments, the above-mentioned two adjacent portions of the surrounding wire 116*s* are two adjacent portions of the surrounding wire 116*s* surrounding two adjacent of the key regions. For example, the connecting wire 1161 is connected between two adjacent portions of the surrounding wire 116*s* surrounding two adjacent key regions 1101 and 1104; the connecting wire 1163 is connected between two adjacent portions of the surrounding wire 116*s* surrounding two adjacent key regions 1102 and 1104; the connecting wire (not marked) is connected between two adjacent portions of the surrounding wire 116*s* surrounding two adjacent key regions 1101 and 1102; the connecting wire (not marked) is connected between two adjacent portions of the surrounding wire 116*s* surrounding two adjacent key regions 1103 and 1104. In some embodiments, a length of the connecting wire 1161, 1162 or 1163 is smaller than a width of one of the key regions (e.g., the key region 1101, 1102, 1103 or 1104). In some embodiments, the connecting wire 1161, 1162 or 1163 is straight, but the invention is not limited thereto.

In some embodiments, the surrounding wire 116*s* includes a circular wire 116*r* surrounding one of the key regions, a continuous wire 116*t* surrounding at least two of the key regions, or a combination thereof. Referring to FIG. 3, the circular wire 116*r* surrounds a single key region 1101, and the continuous wire 116*t* surrounds the key regions 1102, 1104 and 1103.

In some embodiments, the surrounding wire 116*s* includes the circular wire 116*r* and the continuous wire 116*t*. The connecting wire 1161 is connected between a portion of the circular wire 116*r* and a portion of the continuous wire 116*t*, which are adjacent to each other. The connecting wire 1162 is connected between another portion of the circular wire 116*r* and another portion of the continuous wire 116*t*, which are adjacent to each other.

In some embodiments, the surrounding wire 116*s* includes the continuous wire 116*t*, and the connecting wire 1163 is connected between two adjacent portions of the continuous wire 116*t*.

In some embodiments, at least one connecting wire 116*c* is a plurality of connecting wires 1161, 1162, 1163, and two of the connecting wires 1161, 1162 are crossed with each other.

It is worth noting that since the sensing circuit pattern 116 of the present invention has the surrounding wire 116*s* and the connecting wire 116*c* (please refer to FIG. 3, the sensing circuit pattern 116 forms a mesh-shaped circuit pattern), even if a certain portion of the wire is broken, it does not affect signal transmission of the sensing circuit pattern 116.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A keyboard device, comprising:
a membrane circuit board having a plurality of key regions and a peripheral region surrounding the key regions, wherein the membrane circuit board comprises:
a lower membrane layer;
an upper membrane layer disposed over the lower membrane layer; and
a sensing circuit pattern disposed over the upper membrane layer and in the peripheral region, wherein the sensing circuit pattern comprises a surrounding wire and at least one connecting wire, and the surrounding wire surrounds the key regions, and the at least one connecting wire is connected between two adjacent portions of the surrounding wire; and
a support plate disposed beneath the membrane circuit board.

2. The keyboard device of claim 1, wherein a length of the at least one connecting wire is smaller than a width of one of the key regions.

3. The keyboard device of claim 1, wherein the two adjacent portions of the surrounding wire are two adjacent portions of the surrounding wire surrounding two adjacent key regions.

4. The keyboard device of claim 1, wherein the at least one connecting wire is straight.

5. The keyboard device of claim 1, wherein the surrounding wire comprises a circular wire surrounding one of the key regions, a continuous wire surrounding at least two of the key regions, or a combination thereof.

6. The keyboard device of claim 5, wherein the surrounding wire comprises the circular wire and the continuous wire, and the at least one connecting wire is connected between a portion of the circular wire and a portion of the continuous wire, and the portion of the circular wire and the portion of the continuous wire are adjacent to each other.

7. The keyboard device of claim 5, wherein the surrounding wire comprises the continuous wire, and the at least one connecting wire is connected between two adjacent portions of the continuous wire.

8. The keyboard device of claim 1, wherein the at least one connecting wire is a plurality of connecting wires, and two of the connecting wires are crossed with each other.

9. The keyboard device of claim 1, wherein the sensing circuit pattern is not disposed in the key regions.

10. The keyboard device of claim 1, further comprising:
a circuit board disposed beneath the support plate; and
a receiving wire disposed between the support plate and the membrane circuit board, wherein the support plate has a plurality of through openings, and the receiving wire is adjacent to the through openings.

* * * * *